United States Patent
Wang

(10) Patent No.: US 12,281,031 B2
(45) Date of Patent: Apr. 22, 2025

(54) ULTRAVIOLET LIGHT DISINFECTION APPARATUS, CONTROL BOX AND MASSAGE POOL

(71) Applicant: ORIENTAL RECREATIONAL PRODUCTS CO. LTD, Shanghai (CN)

(72) Inventor: Zhiyue Wang, Shanghai (CN)

(73) Assignee: ORIENTAL RECREATIONAL PRODUCTS (SHANGHAI) CO., LTD, Shanghai (CN)

(*) Notice: Subject to any disclaimer, the term of this patent is extended or adjusted under 35 U.S.C. 154(b) by 389 days.

(21) Appl. No.: 17/790,880

(22) PCT Filed: Apr. 29, 2021

(86) PCT No.: PCT/CN2021/090875
§ 371 (c)(1),
(2) Date: Jul. 5, 2022

(87) PCT Pub. No.: WO2021/227884
PCT Pub. Date: Nov. 18, 2021

(65) Prior Publication Data
US 2023/0030118 A1     Feb. 2, 2023

(30) Foreign Application Priority Data
May 15, 2020   (CN) .......................... 202010412394.7

(51) Int. Cl.
*C02F 1/32*   (2023.01)
*C02F 103/42*   (2006.01)

(52) U.S. Cl.
CPC .......... *C02F 1/325* (2013.01); *C02F 2103/42* (2013.01); *C02F 2201/3221* (2013.01);
(Continued)

(58) Field of Classification Search
CPC .................. C02F 1/325; C02F 2103/42; C02F 2201/3221; C02F 2201/3222; C02F 2201/326; C02F 2303/04
See application file for complete search history.

(56) References Cited

U.S. PATENT DOCUMENTS

| | | | |
|---|---|---|---|
| 10,442,707 B1 | 10/2019 | Johnston et al. | |
| 2011/0226966 A1* | 9/2011 | Takahashi | ............... C02F 1/325 |
| | | | 250/492.1 |

FOREIGN PATENT DOCUMENTS

| | | |
|---|---|---|
| CN | 103572989 | 2/2014 |
| CN | 103900259 | 7/2014 |
| | (Continued) | |

OTHER PUBLICATIONS

"English translation of International Search Report of the China National Intellectual Property Administration", PCT International Application No. PCT/CN2021/090875 completed Jul. 19, 2021, Aug. 2, 2021, Beijing China (3 pages).

*Primary Examiner* — Nicole M Ippolito
(74) *Attorney, Agent, or Firm* — Woods Oviatt Gilman LLP; Katherine H. McGuire, Esq.

(57) ABSTRACT

Disclosed is an ultraviolet light disinfection apparatus mounted on a water pipe that is connected to a massage pool. The ultraviolet light disinfection apparatus comprises: a housing mounted on the water pipe and in closed connection with the water pipe; a PCB disposed inside the housing and provided with a UVC-LED light source and a wire, the wire protruding from the housing to connect to the power source; an ultraviolet light-transmitting body disposed on the housing, such that ultraviolet light at UVC wavelength range produced by the UVC-LED light source can enter into water body inside the water pipe through the ultraviolet-transmit-
(Continued)

ting body. The present invention can disinfect the water body inside the water pipe. Also provided are a control box and a massage pool.

16 Claims, 3 Drawing Sheets

(52) U.S. Cl.
CPC .............. *C02F 2201/3222* (2013.01); *C02F 2201/326* (2013.01); *C02F 2303/04* (2013.01)

(56) References Cited

FOREIGN PATENT DOCUMENTS

| | | |
|---|---|---|
| CN | 207046898 | 2/2018 |
| CN | 107840408 | 3/2018 |
| CN | 208667170 | 3/2019 |
| CN | 212562671 | 2/2021 |

* cited by examiner

ULTRAVIOLET LIGHT DISINFECTION APPARATUS, CONTROL BOX AND MASSAGE POOL

TECHNICAL FIELD

The present invention relates to the technical field of massage pools, in particular to an ultraviolet light disinfection apparatus, a control box and a massage pool.

BACKGROUND

In current urban life, due to the fact that the pace of life is fast and working pressure is high, more leisure modes are needed to improve the pleasure of life. Compared with a traditional pool, a massage pool has the massage and leisure functions, and people can relax the body and mind and enjoy life during bathing, so that the massage pool is generally welcomed by people. An existing massage pool includes a pool body and a water pipe connected to the pool body, wherein water is supplied to the pool body or replaced through the water pipe, and water in the pool body is used for leisure and entertainment. Since a user needs to make contact with water, and water contains bacteria and other impurities, the health and leisure experience of the user can be affected if water in the pool body is not clean.

SUMMARY

The present invention aims at solving the technical problem that water in an existing massage pool for entertainment and leisure of a user is not clean. The present invention provides an ultraviolet light disinfection apparatus which is used for producing ultraviolet light in a UVC wavelength range to disinfect a water body in a water pipe, so that water in a massage pool for entertainment and leisure of a user is clean.

In order to solve the above technical problem, an implementation mode of the present invention discloses an ultraviolet light disinfection apparatus mounted on a water pipe that is connected to a massage pool. The ultraviolet light disinfection apparatus includes: a housing mounted on the water pipe and in closed connection with the water pipe; a PCB (Printed Circuit Board) disposed inside the housing and provided with a UVC-LED light source and a wire that protrudes from the housing to be connected to a power source; an ultraviolet light-transmitting body disposed on the housing such that ultraviolet light in a UVC wavelength range produced by the UVC-LED light source can penetrate through the ultraviolet light-transmitting body to enter a water body inside the water pipe.

By adopting the above technical solution, ultraviolet light in the UVC wavelength range can be produced to disinfect the water body in the water pipe, so that water in the massage pool for entertainment and leisure of a user is clean.

According to another implementation mode of the present invention, the housing includes an outer housing and an inner housing which are detachably connected, the outer housing is mounted on the water pipe and is in closed connection with the water pipe, the inner housing is provided with a through hole for the wire to pass, the outer housing and the inner housing enclose a containing cavity, the PCB, the UVC-LED light source and the ultraviolet light-transmitting body are located in the containing cavity, and a window allowing ultraviolet light to transmit is formed in a part, corresponding to the ultraviolet light-transmitting body, of a wall of the outer housing.

According to another specific implementation mode of the present invention, the PCB is mounted on a wall, facing the ultraviolet light-transmitting body, of the inner housing, and the UVC-LED light source and the ultraviolet light-transmitting body are oppositely arranged; and the window is disposed on a wall, facing the inner housing, of the outer housing, and the ultraviolet light-transmitting body covers the window and is in closed connection with the wall, facing the inner housing, of the outer housing.

According to another specific implementation mode of the present invention, the window is in a trumpet shape.

According to another specific implementation mode of the present invention, a first annular groove is formed in the wall, facing the inner housing, of the outer housing, a first annular sealing piece is disposed in the first annular groove, and the ultraviolet light-transmitting body is in closed connection with the wall, facing the inner housing, of the outer housing through the first annular sealing piece.

According to another specific implementation mode of the present invention, the first annular sealing piece is in interference fit with the ultraviolet light-transmitting body.

According to another specific implementation mode of the present invention, a gasket is disposed between the inner housing and the ultraviolet light-transmitting body, and the gasket abuts against the inner housing and the ultraviolet light-transmitting body respectively.

According to another specific implementation mode of the present invention, the outer housing is in threaded connection with the inner housing.

According to another specific implementation mode of the present invention, the inner housing is in a T shape, and a part, located outside the outer housing, of the inner housing abuts against an end of the outer housing in a mounting direction of the inner housing and the outer housing.

According to another specific implementation mode of the present invention, the outer housing is in a T shape, and a part, located outside the water pipe, of the outer housing abuts against an outer wall of the water pipe in a mounting direction of the inner housing and the outer housing.

According to another specific implementation mode of the present invention, the wire protrudes from the through hole and is in closed connection at an outlet of the through hole.

According to another specific implementation mode of the present invention, the ultraviolet light-transmitting body is quartz glass.

The present invention further provides a control box, including: a water pipe connected to a water pipe joint of a massage pool and provided with a mounting part; and the above any ultraviolet light disinfection apparatus mounted on the mounting part of the water pipe, in closed connection with the mounting part and used for producing ultraviolet light in a UVC wavelength range so as to disinfect a water body in the water pipe.

According to another specific implementation mode of the present invention, the mounting part is provided with a through hole, the housing of the ultraviolet light disinfection apparatus is inserted into the through hole, and a part, located outside the through hole, of the housing abuts against and is in closed connection with the water pipe.

According to another specific implementation mode of the present invention, a second annular groove is formed in an outer wall of the water pipe, the second annular groove surrounds the through hole, a second annular sealing piece is disposed in the second annular groove, and the part, located outside the through hole, of the housing is in closed connection with the water pipe through the second annular sealing piece.

According to another specific implementation mode of the present invention, the second annular sealing piece is in interference fit with the part, located outside the through hole, of the housing.

The present invention also provides a massage pool, including: a pool body provided with a water pipe joint; a water pipe connected to the water pipe joint and provided with a mounting part; and the above any ultraviolet light disinfection apparatus mounted on the mounting part of the water pipe, in closed connection with the mounting part and used for producing ultraviolet light in a UVC wavelength range so as to disinfect a water body in the water pipe.

DETAILED DESCRIPTION OF THE EMBODIMENTS

Figure 1:
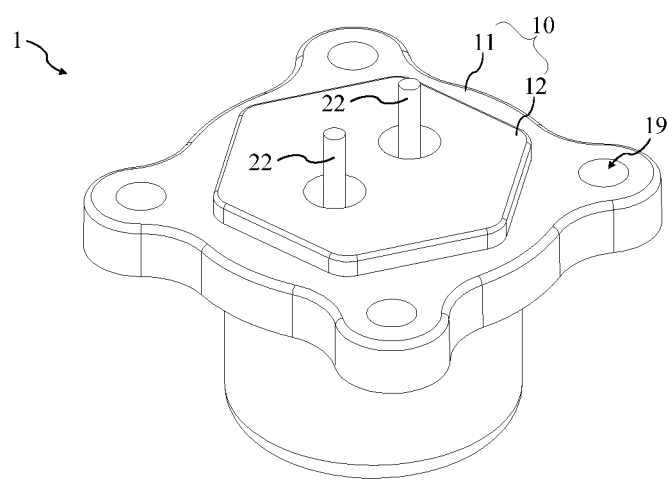
FIG. 1 is a stereogram of an ultraviolet light disinfection apparatus according to an embodiment of the present invention.

Implementation modes of the present invention are illustrated by specific embodiments below, and those skilled in the art can easily understand other advantages and effects of the present invention according to the content disclosed in the specification. Although the description of the present invention will be introduced in conjunction with preferred embodiments, this does not represent that the features of the present invention are only limited in the embodiments. On the contrary, the description of the present invention in conjunction with the implementation modes is intended to cover other alternatives or modifications that may be extended based on the claims of the present invention. In order to thoroughly understand the present invention, the following description will contain many specific details. The present invention may also be implemented without using these details. In addition, in order to avoid confusion or obscuring of the key point of the present invention, some specific details are omitted in the description. It should be noted that the following embodiments and features in the embodiments may be combined with each other under the condition of no conflict.

It should be noted that in the specification, similar reference numerals and letters represent similar items in the drawings below, so that once a certain item is defined in one drawing, the item does not need to be further defined and explained in the subsequent drawings.

The terms "first", "second", or the like are only used to distinguish the descriptions, but cannot be understood as indicating or implying relative importance.

In the description of the embodiment, it should also be noted that the terms "dispose" and "connect" should be understood in a broad sense unless otherwise specified and limited, for example, it may be fixed connection, also may be detachable connection or integrated connection, and may be mechanical connection or electric connection. For those of ordinary skill in the art, the specific meaning of the above terms in the embodiment may be understood according to specific situations.

In order to make the objective, the technical solutions and the advantages of the present invention clearer, the implementation modes of the present invention are further described in detail in combination with the attached drawings.

Referring to FIG. 1 to FIG. 4, the present invention provides an ultraviolet light disinfection apparatus 1 mounted on a water pipe 41 connected to a massage pool. The ultraviolet light disinfection apparatus 1 includes: a housing 10 mounted on the water pipe 41 and in closed connection with the water pipe 41; and a PCB (Printed Circuit Board) 20 disposed in the housing 10, and provided with a UVC-LED light source 21 and a wire 22 that protrudes from the housing 10 to be connected to a power source (not shown in the figure), wherein after the UVC-LED light source 21 is connected to the power source through the wire 22, ultraviolet light in a UVC wavelength range can be produced, and ultraviolet light in the UVC wavelength range has a wavelength of 200 nm to 275 nm, and is also referred to as short-wave disinfection ultraviolet light.

An ultraviolet light-transmitting body 30 is further disposed on the housing 10, ultraviolet light in the UVC wavelength range produced by the UVC-LED light source 21 can penetrate through the ultraviolet light-transmitting body 30 to enter a water body in the water pipe 41, so as to achieve the disinfection and sterilization effects on the water body in the water pipe 41, and kill bacteria and organic matters, and therefore water entering the pool body of the massage pool is clean, and good leisure and entertainment experience in the massage pool is achieved. The specific type of the ultraviolet-transmitting body 30 is not limited, as long as ultraviolet light in the UVC wavelength range can penetrate through the ultraviolet light-transmitting body 30. Optionally, the ultraviolet light-transmitting body 30 is quartz glass. It should be noted that water can be supplied to the massage pool by the water pipe 41 connected to the massage pool, and water circulation in the massage pool can also be achieved by the water pipe 41.

Figure 2:
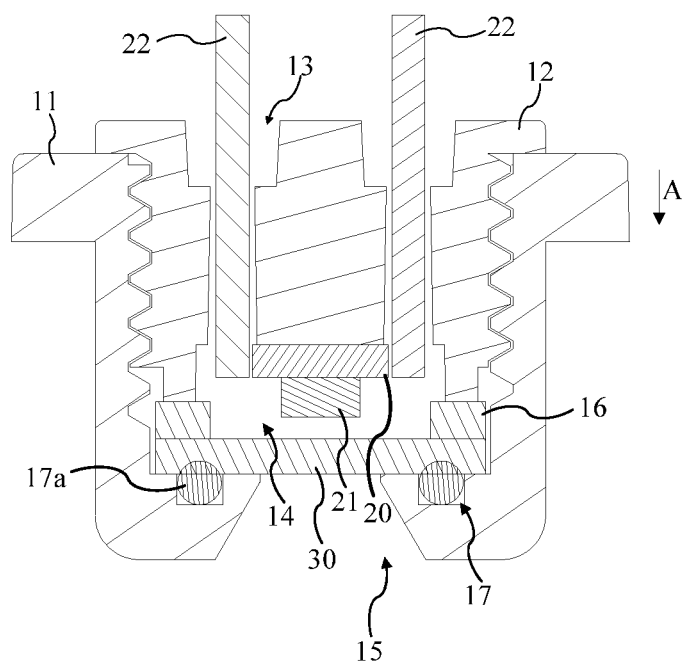
FIG. 2 is a section view of an ultraviolet light disinfection apparatus according to an embodiment of the present invention.

With continued reference to FIG. 1 and FIG. 2, the housing 10 includes an outer housing 11 and an inner housing 12 which are in detachable connection, the form of the detachable connection is not limited, and optionally, in the embodiment, the outer housing 11 and the inner housing 12 are in threaded connection to achieve detachable connection. The outer housing 11 is mounted on the water pipe 41 and is in closed connection with the water pipe 41, a through hole 13 for the wire 22 to pass is formed in the inner housing 12, and the wire 22 protrudes from the through hole 13 and is in closed connection at an outlet of the through hole 13, for example, glue is dispensed at the position of the through hole 13 to achieve sealed connection. The wire 22 is connected to the PCB 20 and passes through the through hole 13 in the inner housing 12 to be connected to the power source.

The outer housing 11 and the inner housing 12 enclose a containing cavity 14, the PCB 20, the UVC-LED light source 21 and the ultraviolet light-transmitting body 30 are located in the containing cavity 14, a window 15 allowing ultraviolet light to transmit is formed in a part, corresponding to the ultraviolet light-transmitting body 30, of a wall of the outer housing 11, and the window 15 is located in an inner cavity 42 of the water pipe 41.

Optionally, the window 15 is in a trumpet shape. That is, an inner diameter of the window 15 gradually increases in a mounting direction (as shown in an A direction in FIG. 2) of the inner housing 12 and the outer housing 11. Such an arrangement is conductive to outwardly diffusing ultraviolet light in the UVC wavelength range after ultraviolet light penetrates through the ultraviolet light-transmitting body 30, enlarging the disinfection range and improving the disinfection efficiency of ultraviolet light in the UVC wavelength range.

Optionally, referring to FIG. 2, the PCB 20 is mounted on a wall, facing the ultraviolet light-transmitting body 30, of the inner housing 12, and the UVC-LED light source 21 and the ultraviolet light-transmitting body 30 are oppositely arranged. Optionally, the UVC-LED light source 21 and the ultraviolet light-transmitting body 30 are oppositely arranged in a spaced manner. The window 15 is disposed on a wall, facing the inner housing 12, of the outer housing 11, and the ultraviolet light-transmitting body 30 covers the window 15 and is in closed connection with the wall, facing the inner housing 12, of the outer housing 11.

Optionally, referring to FIG. 2, a first annular groove 17 is formed in the wall, facing the inner housing 12, of the outer housing 11, the first annular groove 17 surrounds the window 15, a first annular sealing piece 17a is disposed in the first annular groove 17, and the ultraviolet light-transmitting body 30 is in closed connection with the wall, facing the inner housing 12, of the outer housing 11 through the first annular sealing piece 17a. The specific type of the first annular sealing piece 17a is not limited, as long as sealing can be achieved. Optionally, the first annular sealing piece 17a is an O-shaped sealing ring.

Optionally, the first annular sealing piece 17a is in interference fit with the ultraviolet light-transmitting body 30. In the foregoing embodiments, the outer housing 11 and the inner housing 12 are in threaded connection, in the mounting process of the outer housing 11 and the inner housing 12, a pressing force is produced in the mounting direction of the inner housing 12 and the outer housing 11, and the first annular sealing piece 17a is further pressed so that the first annular sealing piece 17a is in interference fit with the ultraviolet light-transmitting body 30. Therefore, the ultraviolet light-transmitting body 30 and the wall, facing the inner housing 12, of the outer housing 11 are in better sealed connection.

Optionally, referring to FIG. 2, a gasket 16 is disposed between the inner housing 12 and the ultraviolet light-transmitting body 30, and the gasket 16 abuts against the inner housing 12 and the ultraviolet light-transmitting body 30 respectively. The type of the gasket 16 is not limited, and optionally, the gasket 16 is a rubber body. After the gasket 16 is disposed between the inner housing 12 and the ultraviolet light-transmitting body 30, in the mounting process of the outer housing 11 and the inner housing 12, a pressing force is produced in the mounting direction of the inner housing 12 and the outer housing 11, and is transferred to the ultraviolet light-transmitting body 30 through the gasket 16, so that the ultraviolet light-transmitting body 30 is prevented from being damaged, and further pressing of the first annular sealing piece 17a is not affected.

Optionally, referring to FIG. 2, the inner housing 12 is in a T shape, and a part, located outside the outer housing 11, of the inner housing 12 abuts against an end of the outer housing 11 in the mounting direction (as shown in the A direction in FIG. 2) of the inner housing 12 and the outer housing 11. By means of such an arrangement, a mounting limitation effect is achieved to prevent excessive mounting of the inner housing 12 in the outer housing 11 so as to avoid damaging the ultraviolet light disinfection apparatus 1, for example, the UVC-LED light source 21 and the ultraviolet light-transmitting body 30 interfere with each other, and the UVC-LED light source 21 and the ultraviolet light-transmitting body 30 are both damaged.

Figure 4:
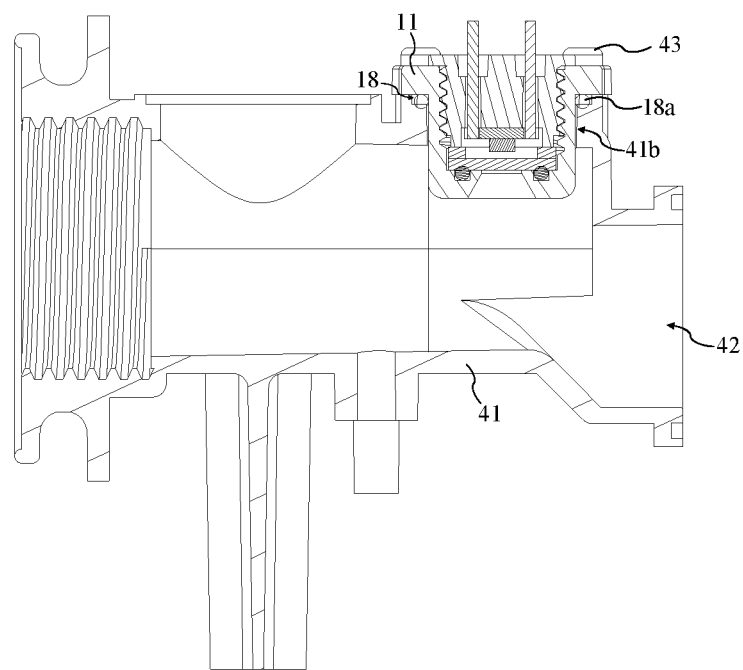
FIG. 4 is a section view I of a control box according to an embodiment of the present invention.

Optionally, referring to FIG. 2 and FIG. 4, the outer housing 11 is in a T shape, and a part, located outside the water pipe 41, of the outer housing 11 abuts against an outer wall of the water pipe 41 in the mounting direction (as shown in the A direction in FIG. 2) of the inner housing 12 and the outer housing 11. By means of such an arrangement, a mounting limitation effect is achieved to prevent the ultraviolet light disinfection apparatus 1 from being excessively mounted in the water pipe 41 and even falling into the water pipe 41, and the ultraviolet light disinfection apparatus 1 is easy to replace subsequently.

Figure 3:
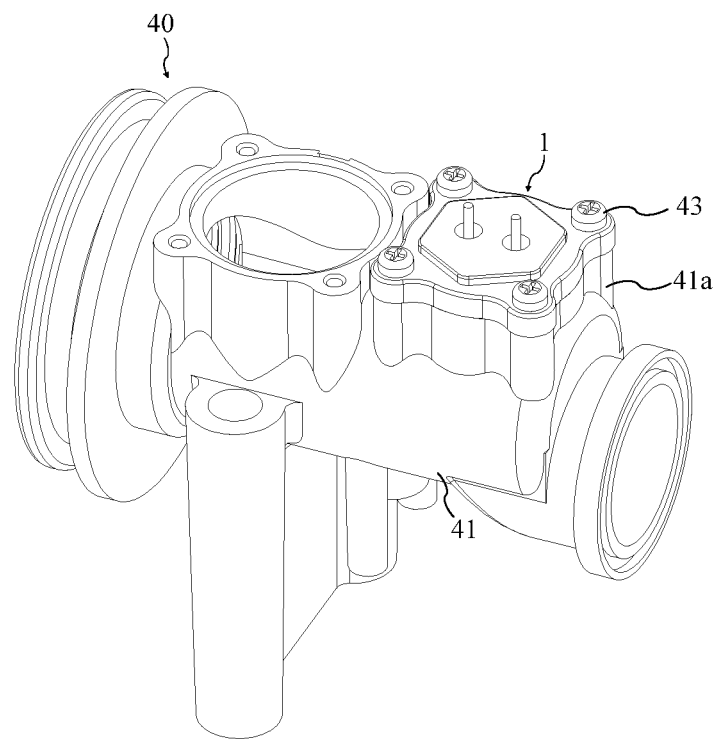
FIG. 3 is a stereogram of a control box according to an embodiment of the present invention.

Referring to FIG. 3 and FIG. 4 and in combination with FIG. 1 and FIG. 2, the present invention also provides a control box 40, including: a water pipe 41, being connected to a water pipe joint (not shown in figures) of a massage pool, and provided with a mounting part 41a; and the ultraviolet light disinfection apparatus 1 in any of the foregoing embodiments, being mounted on the mounting part 41a of the water pipe 41, in closed connection with the mounting part 41a, and used for producing ultraviolet light in a UVC wavelength range so as to disinfect a water body in the water pipe 41.

Figure 5:
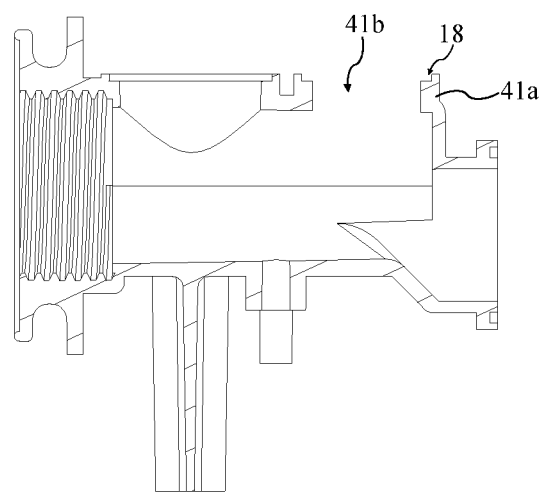
FIG. 5 is a section view II of a control box according to an embodiment of the present invention.

Referring to FIG. 4 and FIG. 5, the mounting part 41a is provided with a through hole 41b, the through hole 41b communicates with an inner cavity 42 of the water pipe 41, and the housing 10 of the ultraviolet light disinfection apparatus 1 is inserted into the through hole 41b. Specifically, the outer housing 11 of the housing 10 is inserted into the through hole 41b, and a part, located outside the through hole 41b, of the housing 10 abuts against and is in closed connection with the water pipe 41. Particularly, a part, located outside the through hole 41b, of the T-shaped outer housing 11 abuts against and is in closed connection with the water pipe 41.

Referring to FIG. 4 and FIG. 5, a second annular groove 18 is formed in an outer wall of the mounting part 41a of the water pipe 41, the second annular groove 18 surrounds the through hole 41b, a second annular sealing piece 18a is disposed in the second annular groove 18, and the part, located outside the through hole 41b, of the housing 10 is in closed connection with the water pipe 41 through the second annular sealing piece 18a. The specific type of the second annular sealing piece 18a is not limited, as long as sealing can be achieved. Optionally, the second annular sealing piece 18a is an O-shaped sealing ring.

Optionally, the second annular sealing piece 18a is in interference fit with the part, located outside the through hole 41b, of the housing 10. In the foregoing embodiments, the outer housing 11 and the inner housing 12 are in threaded connection, and a pressing force is produced in the mounting direction of the inner housing 12 and the outer housing 11 in the mounting process of the outer housing 11 and the inner housing 12. Since the inner housing 12 is also in a T shape, a part, located outside the outer housing 11, of the inner housing 12 may tightly press the part, located outside the through hole 41b, of the outer housing 11, so that the second annular sealing piece 18a is in interference fit with the part, located outside the through hole 41b, of the housing 11. Therefore, the housing 11 and the mounting part 41a are in better sealing connection.

Referring to FIG. 1, FIG. 3 and FIG. 4, bolt holes are formed in the mounting part 41*a*, bolt holes 19 are also formed in a part corresponding to the part, outside the through hole 41*b*, of the outer housing 11, and therefore the mounting part 41*a* and the outer housing 11 are fixedly connected through bolts 43. However, the fixed connection mode is not limited by this, and other modes capable of fixedly connecting the outer housing 11 with the mounting part 41*a* are also available.

Referring to FIG. 1 to FIG. 5, the present invention also provides a massage pool, including: a pool body (not shown in figures), being provided with a water pipe joint (not shown in figures); a water pipe 41, being connected to the water pipe joint and provided with a mounting part 41*a*; the ultraviolet light disinfection apparatus 1 in any of the foregoing embodiments, being mounted on the mounting part 41*a* of the water pipe 41, in closed connection with the mounting part 41*a*, and used for producing ultraviolet light in a UVC wavelength range so as to disinfect a water body in the water pipe 41. Water in the pool body of the massage pool for leisure entertainment of a user is clean, and the user experience is good.

It should be noted that the water pipe 41 connected to the massage pool can be exposed outside the pool body or may also be buried in the pool body. That is, the ultraviolet light disinfection apparatus 1 can be located outside the pool body or may also be buried in the pool body. Also namely, the arrangement position of the ultraviolet light disinfection apparatus 1 is not limited, as long as the ultraviolet light disinfection apparatus 1 can produce ultraviolet light in the UVC wavelength range to disinfect the water body in the water pipe 41.

Although the present invention has been illustrated and described with reference to some preferred embodiments of the present invention, those of ordinary skill in the art should understand that the above content is a further detailed description of the present invention in conjunction with the specific embodiments, and it cannot be assumed that the specific implementations of the present invention are limited only by these descriptions. Those skilled in the art may make various changes in forms and details, including making several simple deductions or substitutions, without departing from the spirit and scope of the present invention.

What is claimed is:

1. An ultraviolet light disinfection apparatus, characterized by being mounted on a water pipe connected to a massage pool, and comprising:
   a housing, being mounted on the water pipe and in closed connection with the water pipe;
   a PCB (Printed Circuit Board), being disposed in the housing, and provided with a UVC-LED light source and a wire that protrudes from the housing to be connected to a power source; and an ultraviolet light-transmitting body, being disposed on the housing, wherein ultraviolet light in a UVC wavelength range produced by the UVC-LED light source can penetrate through the ultraviolet light-transmitting body to enter a water body inside the water pipe, characterized in that the housing comprises an outer housing and an inner housing which are detachably connected, the outer housing is mounted on the water pipe and is in closed connection with the water pipe, the inner housing is provided with a through hole for the wire to pass, the outer housing and the inner housing enclose a containing cavity, the PCB, the UVC-LED light source and the ultraviolet light-transmitting body are located in the containing cavity, and a window allowing ultraviolet light to transmit is formed in a part, corresponding to the ultraviolet light-transmitting body, of a wall of the outer housing.

2. The ultraviolet light disinfection apparatus according to claim 1, characterized in that the PCB is mounted on a wall, facing the ultraviolet light-transmitting body, of the inner housing, and the UVC-LED light source and the ultraviolet light-transmitting body are oppositely arranged; and the window is disposed on a wall, facing the inner housing, of the outer housing, and the ultraviolet light-transmitting body covers the window and is in closed connection with the wall, facing the inner housing, of the outer housing.

3. The ultraviolet light disinfection apparatus according to claim 2, characterized in that the window is in a trumpet shape.

4. The ultraviolet light disinfection apparatus according to claim 2, characterized in that a first annular groove is formed in the wall, facing the inner housing, of the outer housing, a first annular sealing piece is disposed in the first annular groove, and the ultraviolet light-transmitting body is in closed connection with the wall, facing the inner housing, of the outer housing through the first annular sealing piece.

5. The ultraviolet light disinfection apparatus according to claim 4, characterized in that the first annular sealing piece is in interference fit with the ultraviolet light-transmitting body.

6. The ultraviolet light disinfection apparatus according to claim 1, characterized in that a gasket is disposed between the inner housing and the ultraviolet light-transmitting body, and the gasket abuts against the inner housing and the ultraviolet light-transmitting body respectively.

7. The ultraviolet light disinfection apparatus according to claim 1, characterized in that the outer housing is in threaded connection with the inner housing.

8. The ultraviolet light disinfection apparatus according to claim 7, characterized in that the inner housing is in a T shape, and a part, located outside the outer housing, of the inner housing abuts against an end of the outer housing in a mounting direction of the inner housing and the outer housing.

9. The ultraviolet light disinfection apparatus according to claim 7, characterized in that the outer housing is in a T shape, and a part, located outside the water pipe, of the outer housing abuts against an outer wall of the water pipe in the mounting direction of the inner housing and the outer housing.

10. The ultraviolet light disinfection apparatus according to claim 1, characterized in that the wire protrudes from the through hole and is in closed connection at an outlet of the through hole.

11. The ultraviolet light disinfection apparatus according to claim 1, characterized in that the ultraviolet light-transmitting body is quartz glass.

12. A control box, characterized by comprising:
    a water pipe, being connected to a water pipe joint of a massage pool, and provided with a mounting part; and
    the ultraviolet light disinfection apparatus according to claim 1, being mounted on the mounting part of the water pipe, in closed connection with the mounting part and used for producing ultraviolet light in a UVC wavelength range so as to disinfect a water body in the water pipe.

13. The control box according to claim 12, characterized in that the mounting part is provided with a through hole, the housing of the ultraviolet light disinfection apparatus is inserted into the through hole, and a part, located outside the through hole, of the housing abuts against and is in closed connection with the water pipe.

14. The control box according to claim 13, characterized in that a second annular groove is formed in an outer wall of the water pipe, the second annular groove surrounds the through hole, a second annular sealing piece is disposed in the second annular groove, and the part, located outside the through hole, of the housing is in closed connection with the water pipe through the second annular sealing piece.

15. The control box according to claim 14, characterized in that the second annular sealing piece is in interference fit with the part, located outside the through hole, of the housing.

16. A massage pool, characterized by comprising:
   a pool body, being provided with a water pipe joint;
   a water pipe, being connected to the water pipe joint and provided with a mounting part; and the ultraviolet light disinfection apparatus according to claim 1, being mounted
   on the mounting part of the water pipe, in closed connection with the mounting part and used for producing ultraviolet light in a UVC wavelength range so as to disinfect a water body in the water pipe.

* * * * *